United States Patent
Mermoud et al.

(10) Patent No.: US 10,778,566 B2
(45) Date of Patent: Sep. 15, 2020

(54) PATTERN DISCOVERY FROM HIGH DIMENSIONAL TELEMETRY DATA USING MACHINE LEARNING IN A NETWORK ASSURANCE SERVICE

(71) Applicant: Cisco Technology, Inc., San Jose, CA (US)

(72) Inventors: Grégory Mermoud, Veyras (CH); Jean-Philippe Vasseur, Saint Martin D'uriage (FR); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 68 days.

(21) Appl. No.: 15/988,084

(22) Filed: May 24, 2018

(65) Prior Publication Data
US 2019/0363971 A1    Nov. 28, 2019

(51) Int. Cl.
| | | |
|---|---|---|
| *H04L 12/24* | (2006.01) | |
| *H04L 12/46* | (2006.01) | |
| *H04L 12/751* | (2013.01) | |
| *H04L 12/26* | (2006.01) | |
| *H04L 29/12* | (2006.01) | |

(52) U.S. Cl.
CPC .......... *H04L 45/08* (2013.01); *H04L 12/4641* (2013.01); *H04L 41/0803* (2013.01); *H04L 43/04* (2013.01); *H04L 45/02* (2013.01); *H04L 61/2015* (2013.01)

(58) Field of Classification Search
CPC ............................ H04W 45/08; H04W 43/04
See application file for complete search history.

(56) References Cited

U.S. PATENT DOCUMENTS

| | | | |
|---|---|---|---|
| 2007/0280187 A1* | 12/2007 | Wang | .................. H04L 63/1416 370/338 |
| 2015/0007173 A1 | 1/2015 | Ionescu et al. | |
| 2016/0125039 A1* | 5/2016 | Ekler | ..................... H04L 45/08 706/12 |
| 2016/0379148 A1 | 12/2016 | Brown et al. | |
| 2017/0364561 A1 | 12/2017 | Wu et al. | |

OTHER PUBLICATIONS

Bodík, et al., "Fingerprinting the Datacenter: Automated Classification of Performance Crises", EuroSys'10, Apr. 13-16, 2010, Paris, France., 14 pages, 2010, ACM.
Ofer, et al., "Algorithms for Telemetry Data Mining using Discrete Attributes", Proceedings of the 6th International Conference on Pattern Recognition Applications and Methods (ICPRAM 2017), pp. 309-317, 2017, Science and Technology Publications, Lda.

* cited by examiner

*Primary Examiner* — Angel T Brockman
(74) *Attorney, Agent, or Firm* — Behmke Innovation Group LLC; Kenneth J. Heywood; Jonathon P. Western

(57) ABSTRACT

In one embodiment, a network assurance service that monitors a plurality of networks subdivides telemetry data regarding devices located in the networks into subsets, wherein each subset is associated with a device type, time period, metric type, and network. The service summarizes each subset by computing distribution percentiles of metric values in the subset. The service identifies an outlier subset by comparing distribution percentiles that summarize the subsets. The service reports insight data regarding the outlier subset to a user interface. The service adjusts the subsets based in part on feedback regarding the insight data from the user interface.

18 Claims, 9 Drawing Sheets

PATTERN DISCOVERY FROM HIGH DIMENSIONAL TELEMETRY DATA USING MACHINE LEARNING IN A NETWORK ASSURANCE SERVICE

TECHNICAL FIELD

The present disclosure relates generally to computer networks, and, more particularly, to pattern discovery from high dimensional telemetry data using machine learning in a network assurance service.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
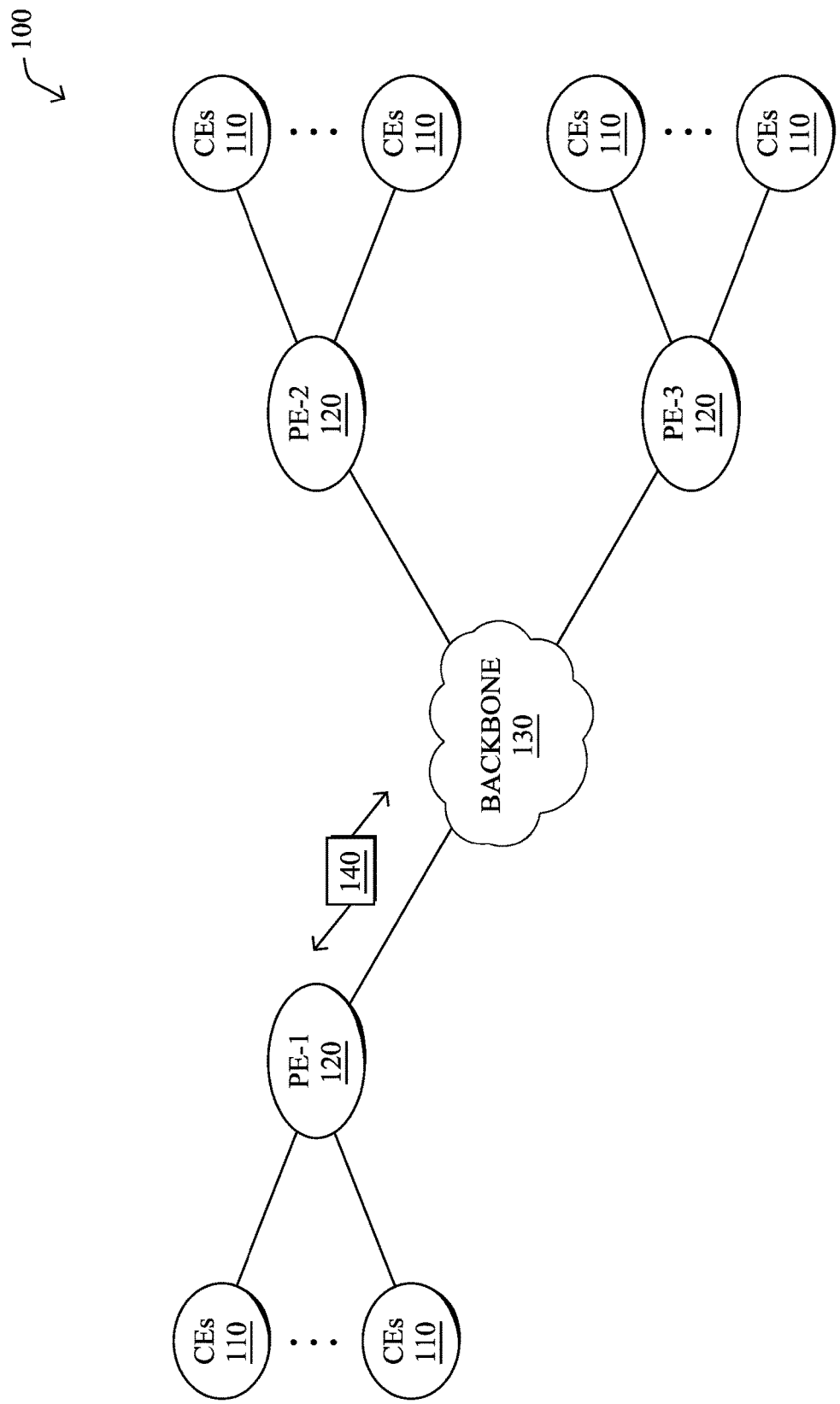
FIGS. 1A-1B illustrate an example communication network.

According to one or more embodiments of the disclosure, a network assurance service that monitors a plurality of networks subdivides telemetry data regarding devices located in the networks into subsets, wherein each subset is associated with a device type, time period, metric type, and network. The service summarizes each subset by computing distribution percentiles of metric values in the subset. The service identifies an outlier subset by comparing distribution percentiles that summarize the subsets. The service reports insight data regarding the outlier subset to a user interface. The service adjusts the subsets based in part on feedback regarding the insight data from the user interface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
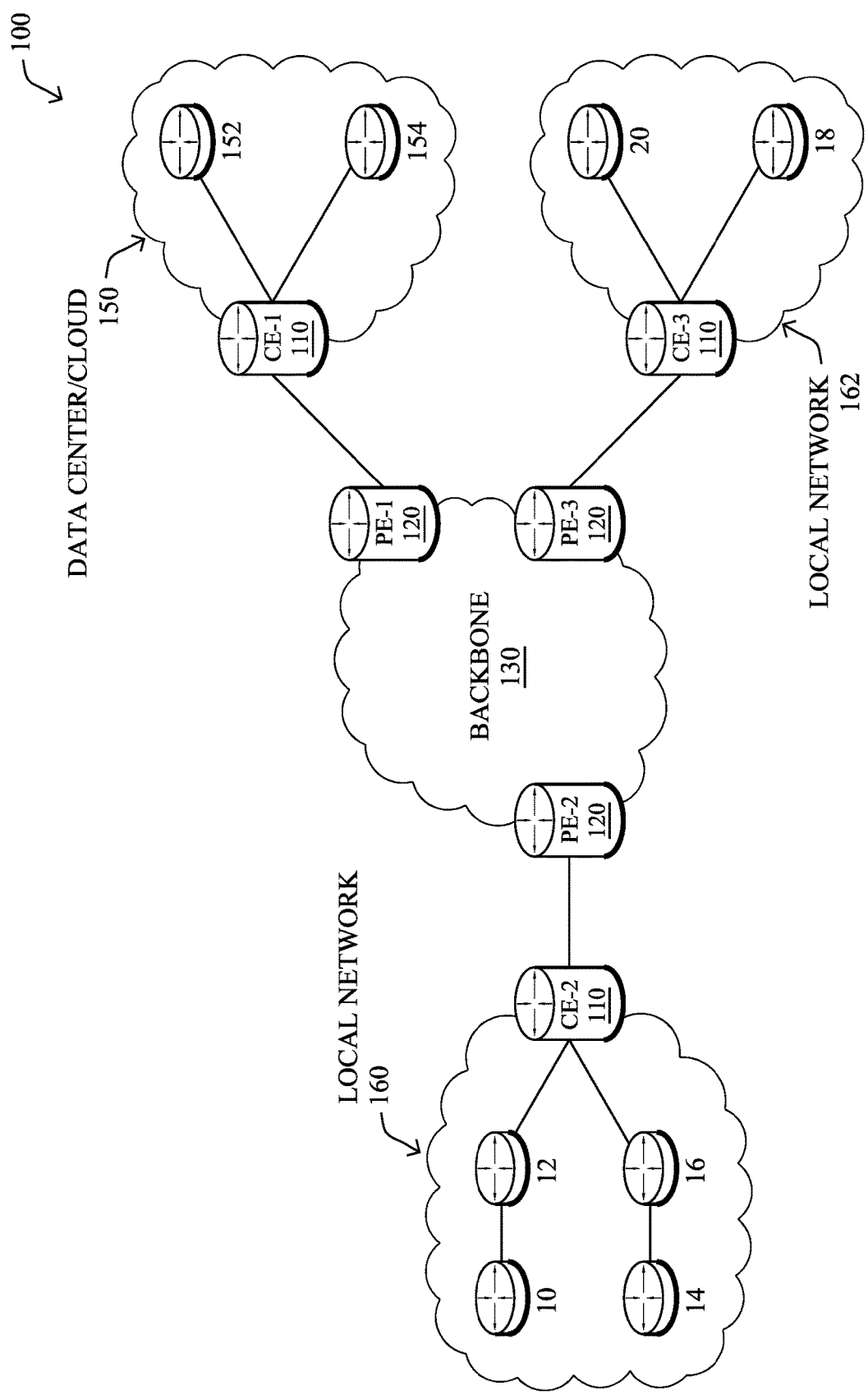

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather is the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
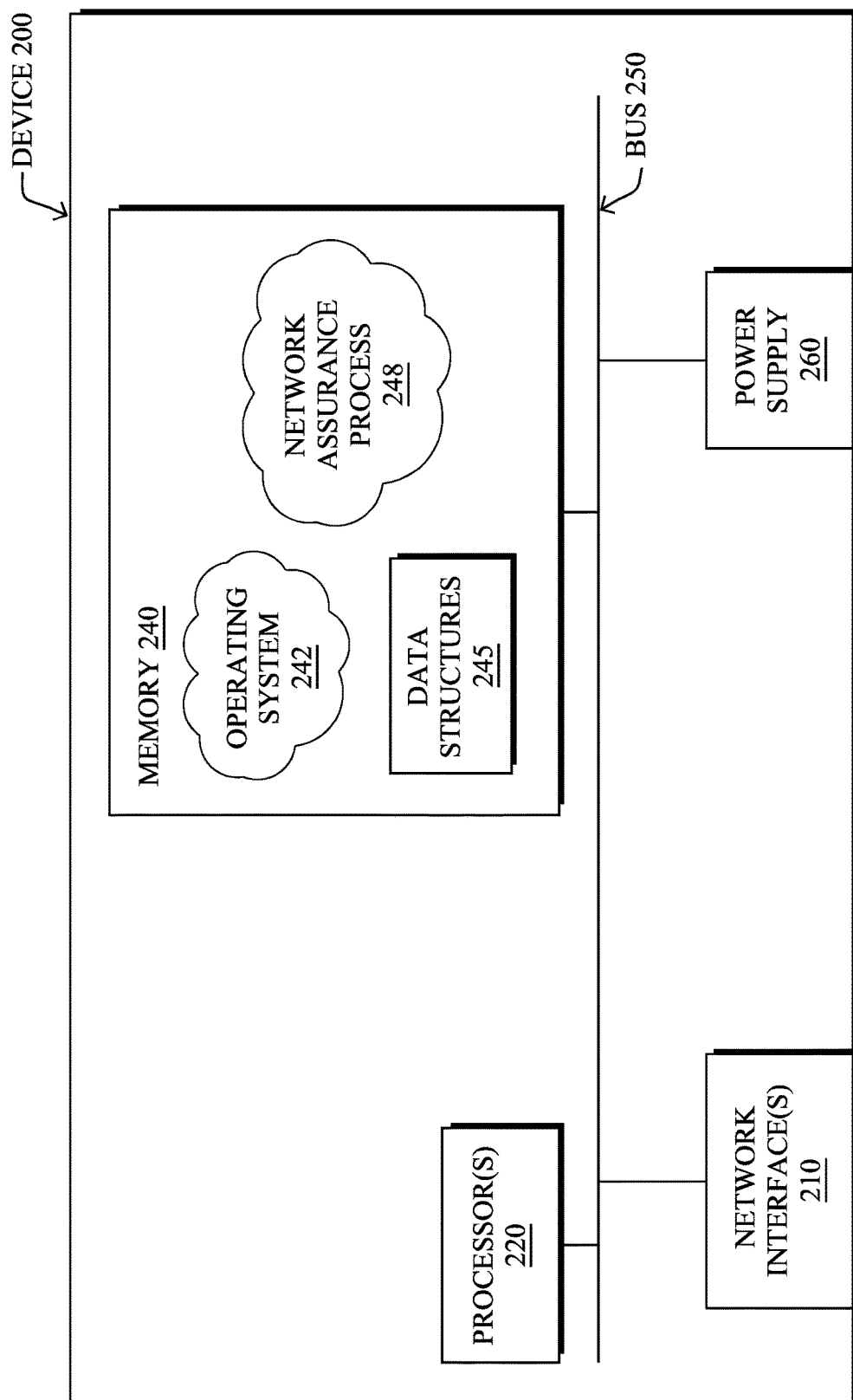
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
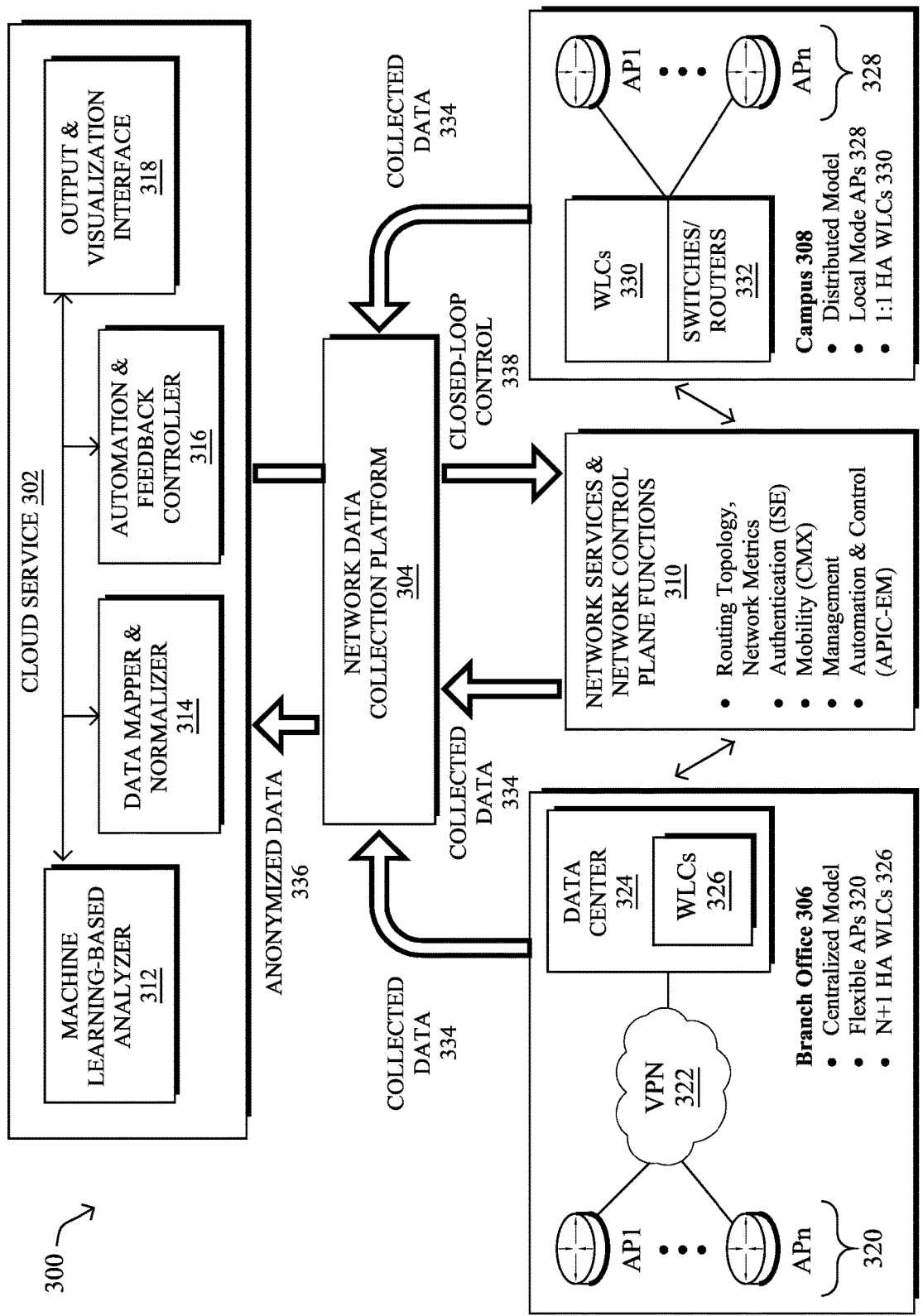
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, computer networks generate large amounts of telemetry data at very high dimensionality. Not only are they characterized by many variables (e.g., configurations, equipment models, geographical organization etc.) and metrics (e.g., traffic, application usage, delay, throughput, CPU, memory, etc.). Both of these are structured objects on their own, with different hierarchies (e.g., routers, switches, access points, controllers, servers, etc.), relationships (topologies at physical, switching, routing level, etc.), and groupings (e.g., by location, purpose, environment, etc.).

As a result, telemetry harvested from large computer networks has a nearly unprecedented level of complexity, especially in the way in its various dimensions are structured and related to each other. Manual exploration of such datasets is absolutely impractical, even more so if one intends to uncover specific patterns from them. In particular, most network issues or outages have an underlying pattern, which is usually associated to a common root cause. For instance, a failing switch may cause several access points to lose connectivity at the same time. The pattern here would be that all connectivity issues would be correlated in time and restricted to access points connected to the specific switch. However, even very acute operators will not be able to uncover such patterns by mere manual inspection of the data.

Pattern Discovery from High Dimensional Telemetry Data Using Machine Learning in a Network Assurance Service The techniques herein introduce a series of mechanisms that allow network operators to quickly uncover hidden patterns from the telemetry data produced by their network and, by extension, obtain actionable insight into their daily operations. Incidentally, such patterns are called insights hereafter, and while they may take different forms depending on the context, they are all intended to be consumed almost readily by the end user, and provide a great deal of actionable intelligence, generally by hinting at the root cause of a problem or its resolution. In some aspects, the techniques herein use a machine learning-based approach to "slice-and-dice" the telemetry datasets for analysis. In further aspects, these mechanisms take the form of interactive visualizations that can be used to collect further information about their relevance and the impact of the underlying patterns being presented to the user, which in turn can be used to suggest more relevant and interesting patterns in the future.

Specifically, according to one or more embodiments of the disclosure as described in detail below, a network assurance service that monitors a plurality of networks subdivides telemetry data regarding devices located in the networks into subsets, wherein each subset is associated with a device type, time period, metric type, and network. The service summarizes each subset by computing distribution percentiles of metric values in the subset. The service identifies an outlier subset by comparing distribution percentiles that summarize the subsets. The service reports insight data regarding the outlier subset to a user interface. The service adjusts the subsets based in part on feedback regarding the insight data from the user interface.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
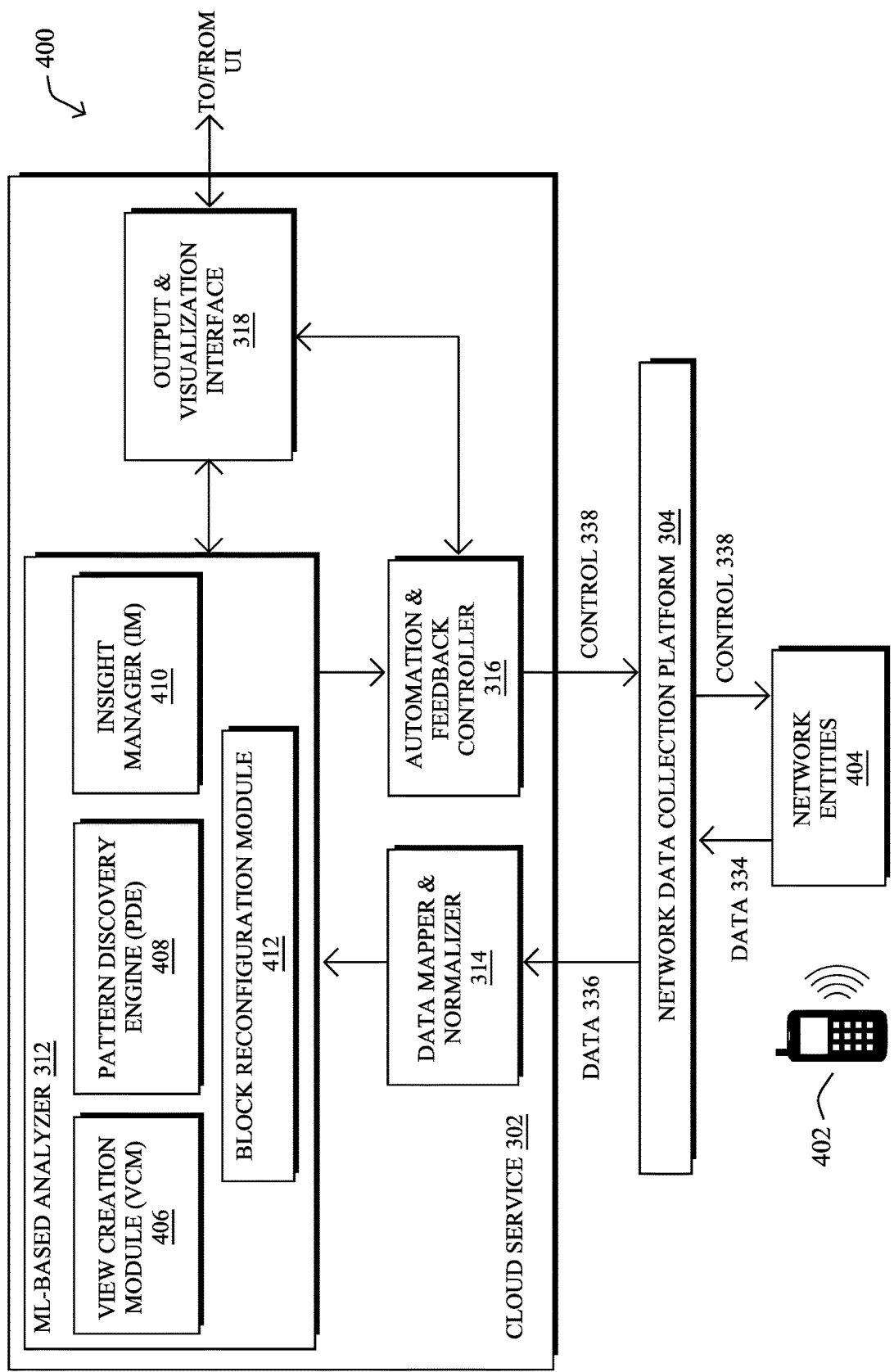
FIG. 4 illustrates an example architecture for performing pattern discovery in a network assurance service.

Operationally, FIG. 4 illustrates an example architecture 400 for performing pattern discovery in a network assurance system, according to various embodiments. At the core of architecture 400 may be the following components: a view creation module 406, a pattern discovery engine (PDE) 408, an insight manager (IM) 410, and/or a block reconfiguration module 412. In some implementations, the components 406-412 of architecture 400 may be implemented within a network assurance system, such as system 300 shown in FIG. 3. Accordingly, the components 406-412 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-412 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using machine learning (ML)-based analyzer 312. For example, ML-based analyzer 312 may include any number of machine learning-based anomaly detectors that look for changes in the behaviors of the monitored network(s). Other functions of ML-based analyzer 312 may include machine learning-based models used for purposes of root cause analysis, prediction, or any of the other functions described previously.

In various embodiments, architecture 400 may include a view creation module (VCM) 406 that is responsible for extracting so-called "network views," which can be thought of as a way to "view" or "slice-and-dice" the telemetry data. In general, such views are designed so as to be generic, but highly customizable, thus allowing service 302 to extract statistical patterns in both an automated and visual way. VCM 406 can be configured to generate all sorts of views for presentation to the user interface (UI) via output and visualization interface 318. In various embodiments, VCM 406 may do so by by comparing different entities/devices in the monitored networks (e.g., radios, APs, AP controllers, routers, etc.) across a network, across time, and/or across organizations (e.g., schools, businesses, government agencies, etc.).

Figure 5:
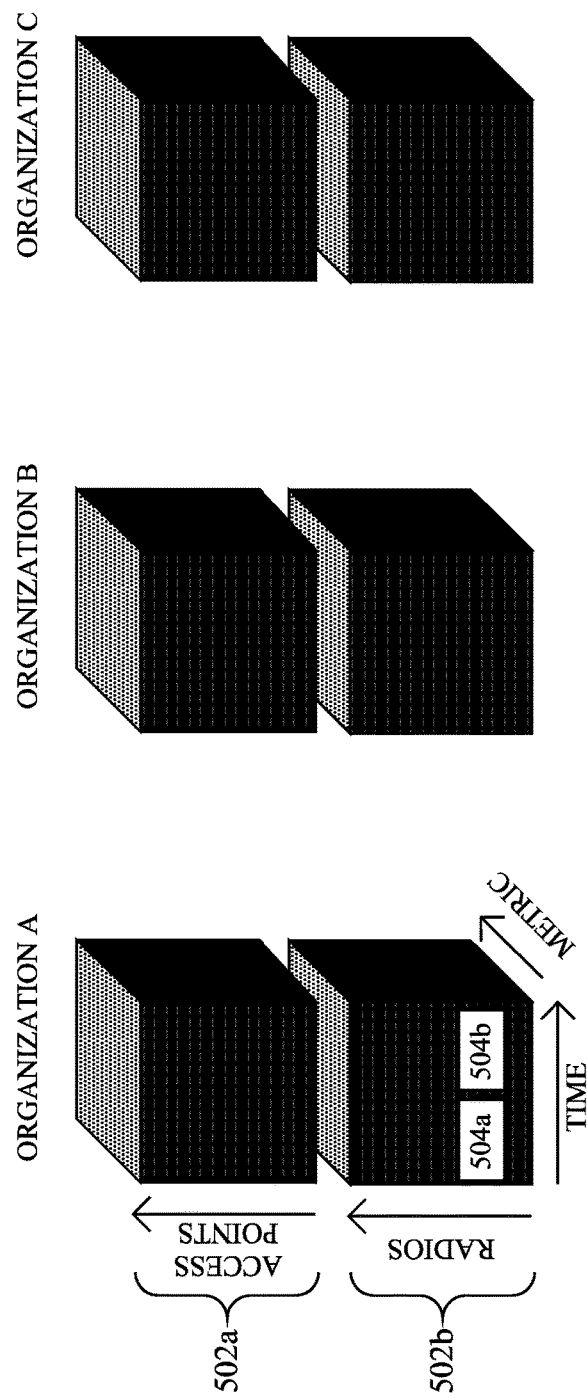
FIG. 5 illustrates an example of subdividing telemetry data.

FIG. 5 illustrates an example 500 of subdividing telemetry data, according to various embodiments. As shown, VCM 406 may represent each dataset from the set of telemetry data as blocks 502 with three dimensions: time period, device type (e.g., access points, radios, etc.) and metrics associated with the device types. Furthermore, a fourth dimension may represent different organizations. For example, a first data block 502a of telemetry data may be associated with access points located in the network of Organization A and for a particular metric, such as client count, wireless association failures, association times, etc. Similarly, a second data block 502b of the telemetry data may represent the radios in that network for the metric.

As shown, data blocks 502 may be divided into subsets 504 by selecting a time interval. For example, as shown, subset 504a in data block 502b may represent the values of particular metric, for a particular device type (e.g., radios), in a particular organization (e.g., organization A), observed over the course of one week and captured in the telemetry data. Similarly, subset 504b may represent the values for that metric, for that device type, in that organization, observed over the course of the subsequent week.

Referring again to FIG. 4, after subdividing the telemetry data into subsets, VCM 406 may summarize each subset by computing distribution percentiles of metric values in the subset, according to various embodiments. Notably, each subset of the telemetry data may have its own distribution over its associated time period from which statistics can be extracted by VCM 406. These statistics can be used to represent the subset in further processing by cloud service 302.

Figure 6:
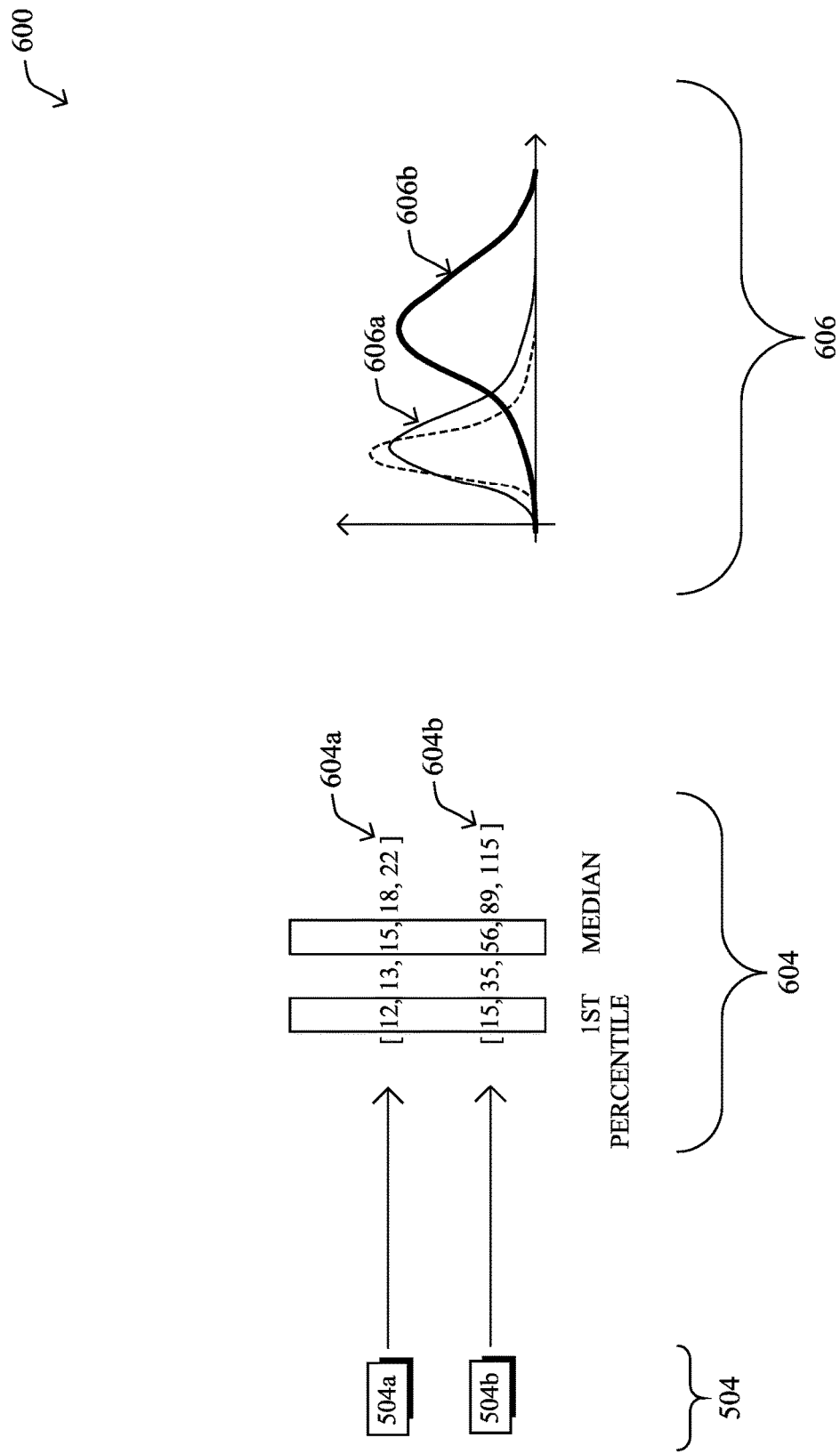
FIG. 6 illustrates an example of summarizing subsets of telemetry data.

FIG. 6 illustrates an example 600 of summarizing subsets 504 of telemetry data, in various embodiments. Continuing the example in FIG. 5, assume that subsets 504a-504b of the captured telemetry data represent the values of a particular metric associated with the radios in a given network over two distinct periods of time (e.g., a day, week, etc.). For example, subset 504a may represent the number of radio failures experienced by the radios over week 24 of the calendar year, while subset 504b may represent the number of radio failures experienced by those radios over week 25 of the calendar year.

Each of subsets 504a and 504b may have a corresponding distribution of metric values 606 (e.g., subset 504a may have a distribution 606a, subset 504b may have a distribution 606b, etc.). From these distributions 606, VCM 406 may calculate their distribution percentiles 604, such as the median of a distribution 606, the first percentile of the distribution 606, etc., which summarizes the distribution and, in turn, the subset 504 of telemetry data. In various embodiments, these summarization statistics can be compared using histogram or distribution comparison techniques, such as the Kolmogorov-Smirnov statistics or other methods.

Referring yet again to FIG. 4, the role of VCM 406 is, therefore, to extract these portions of the telemetry dataset and summarize their distribution in a systematic manner. In some embodiments, VCM 406 may also apply Differential Privacy (DP) to distributions 606 coming from other organizations, such that insights derived from these distributions cannot be used by the end user to uncover the identity and/or confidential information about other participating organizations.

As mentioned, views created by VCM 406 that are meant to be used for cross organization comparison can specify a different granularity partition for telemetry data subset computation. For example, data blocks/subsets computed by VCM 406 on other organization data could be based on generic entity attributes (e.g. external APs, public internet access APs etc.), while a more detailed partitioning (e.g. by building) can be used for the specific organization network. This allows comparing the organization data with equivalent data from different client networks without exposing potentially sensitive data belonging to other organizations.

One of the key features of the data block/subset formation technique described herein is to automate the processing of data thanks to a programmable method for slicing and dicing the telemetry data in high dimensional space, where each data block is then summarized using a statistical distribution of the data (or using other form of data representation using a machine learning-based model).

In one embodiment, data blocks formed by VCM 406 may be configured using a policy-based approach (e.g., rules manually configured by the end user). In another embodiment, data block may be automatically configured using a natural language generation (NLG)-based approach (e.g., end users may use a form-free text approach to perform a request to the system. For example, a user may specify "please compare all radio running the release X, for the variables related to memory usage during the past 6 months." Upon processing such requests, VCM 406 may automatically configure the data blocks, and store summarizations of their resulting distributions.

In yet another embodiment, VCM 406 may configure the data blocks/subsets of the telemetry data according to requests coming from other modules of a system (i.e., not involving an end user). For example, upon detecting a configuration changes, the module in charge of monitoring a given set of radios may request to start an active comparison including that new radio. Note that data blocks may be configured by VCM 406 for a given period of time, or until said otherwise.

Another component of architecture 400 is pattern discovery engine (PDE) 408, which uses the data from VCM 406 to uncover new patterns in the data. In particular, in various embodiments, PDE 408 may systematically scores each new "slice-and-dice" portion of the dataset produced by VCM 406 by comparing it with other relevant portions. In other words, during execution, PDE 408 will evaluate whether significant (statistically speaking) changes have occurred across time (e.g., by comparing newer portions to older ones, like in the case above), as well as across group of entities (e.g., by comparing radios with a certain OS version to others) and/or across organizations. This provides a great deal of flexibility when comparing using the various dimensions: comparison in space (e.g. compare with other radios), comparison in time (e.g., how performance of a given radio evolves over time), and/or in space with other organizations (e.g. different level of granularity).

PDE 408 may assign an outlier score to every summarization from VCM 406, which denotes how significant the deviation is. As such, this score is not enough to identify a truly interesting pattern. Indeed, if the outlier score is large for all portions of the dataset, then it simply denotes different behaviors across the different groups. For example, some APs covering an external area may show a lower client RSSI, but are not really deviations by themselves. Thus, in some embodiments, PDE 408 may further process outlier scores using a machine learning-based clustering approach, to detect true outlier situations.

Figure 7:
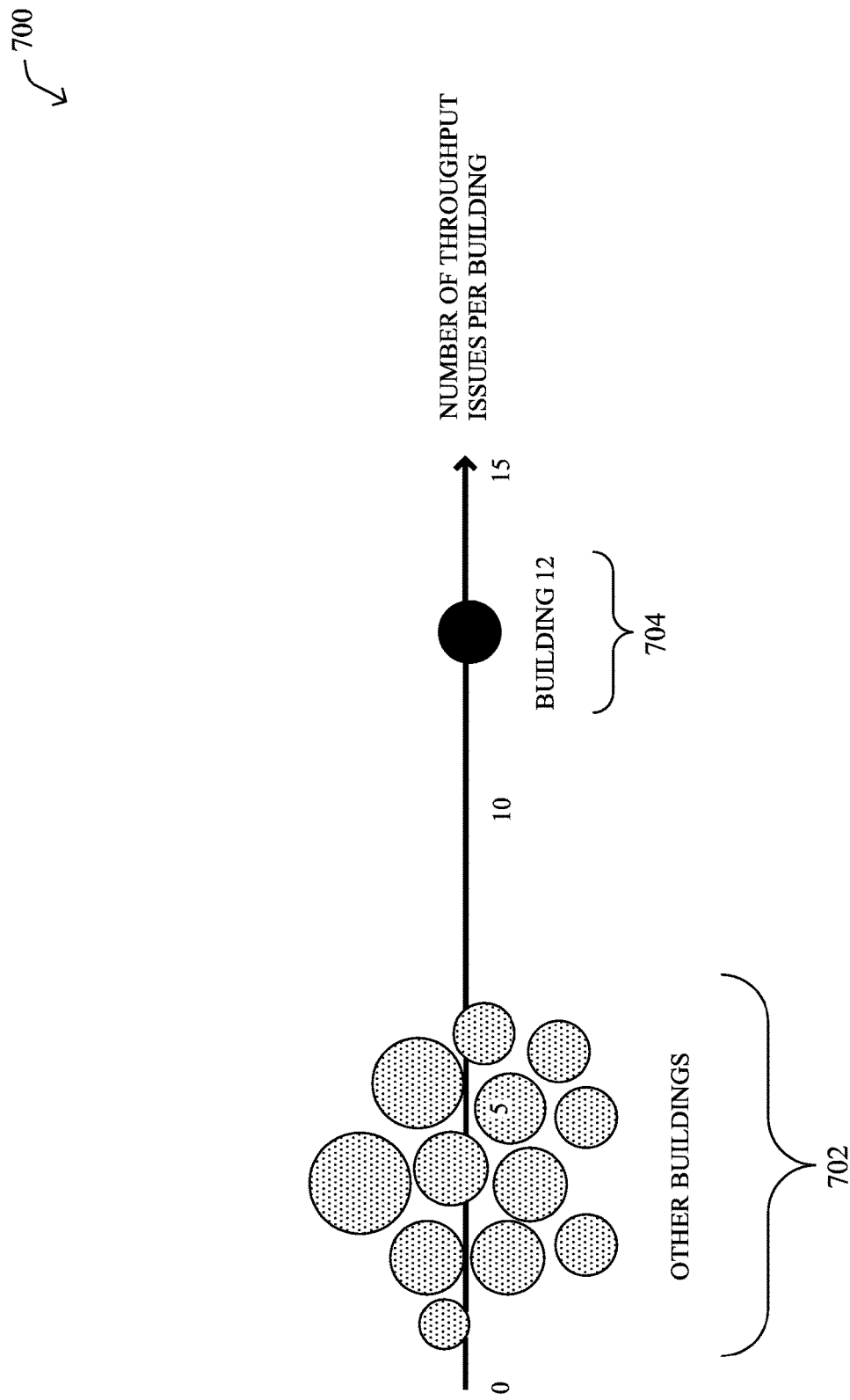
FIG. 7 illustrates an example of identifying an outlier.

FIG. 7 illustrates an example 700 of identifying an outlier, in various embodiments. As shown, assume that the metric under analysis is average number of throughput issues experienced by radios over a week for different radios grouped by building. One group 704, corresponding to "Building 12" stands out particularly as an outlier from that of the group 702 for other buildings by PDE 408. As can be seen, such patterns can be expressed as both visual and textual manner to the UI.

Another example of the operation of PDE 408 may be the observation of a behavioral change of a given component (e.g. link load, router throughput, etc.) over time. In this case, the point would represent the variable associated to the component but at different times. Other insights may be created by PDE 408 by comparing some summarized data blocks/subsets with their equivalent in different organization data sets. For example, a comparison may reveal that the clients in the monitored network show larger onboarding times than most similar organizations.

In various embodiments, architecture 400 may also include an insight manager (IM) 410, which is responsible for selecting those patterns that have been rated as relevant by PDE 408. Among all the statistically significant changes that may be uncovered by PDE 408, only some of them may bear some actual relevance to the user. To this end, IM 410 may use different techniques to perform its selection. In particular, PDE 408 may use feedback from the user collected by output and visualization interface 318 about the relevance of previous insights to select or suppress new ones. Also, beyond a subjective relevance obtained through feedbacks, IM 410 may rely on the more objective notion of impact of a given insight. For instance, example 700 described above with respect to FIG. 7 may bear more or less interest to the user, depending on the number and the type of clients that were impacted by the issues, the applications used at the time of the issues, and the criticality level of the business occurring in Building 12. This notion of impact can be computed by IM 410 from explicit metadata entered by the user via the UI at setup time or based on generally accepted heuristics that may be specific to the desired vertical of the organization.

In another embodiment, IM 410 may learn to evaluate the impact of a given insight from the interactions of the user with the UI. For instance, IM 410 may record the time spent by each user reviewing different assets, and thereby infer which ones should be monitored more closely in the future. An even stronger signal may be when the user uses interactive tools of the UI (e.g., filters, dropdown, zoom, etc.), to focus on a given asset and/or pattern. This can be achieved by IM 410 using UI analytics. Finally, allowing the user to explicitly provide an impact score to the issue via the UI is the most direct and strongest signal that the system can get, in some embodiments. Such signal can be used to refine the internal model of impact estimation used by IM 410. This model may take the form of a regression algorithm, wherein input features are the number and type of client, the application breakdown, etc., and the output label is given by the impact score computed from the user feedback, both implicit (through behavioral analysis) and/or explicit. In a further embodiment, IM 410 can perform a sampling of the insights space in order to submit to the user all types of generated insights over time and gather user feedback in order to drive future insights selection.

According to various embodiments, architecture 400 may also include a block reconfiguration module 412 that allows for a dynamic reconfiguration of the data blocks/subsets, according to the insight raised by IM 410. Thanks to the observation of the number and quality of insights generated, IM 410 may decide to explicitly request that block reconfiguration module 412 reconfigure the data blocks/subsets (e.g., in conjunction with VCM 406). For example, suppose that VCM 406 generates a data block configured to compare all radios running a software release 'R' in a given network, in terms of the number of observed throughput issues. If the number of raised issues in low and the quality (severity) of those issues is low, block reconfiguration module 412 may request that VCM 406 adjust the block/subset configuration by generating a different data block using different metrics. In further embodiments, block reconfiguration module 412 may even be in charge of exploring the space by auto-configuring different data blocks/telemetry data subsets so as to find dimensional split that would generate new interesting insights.

Figure 8:
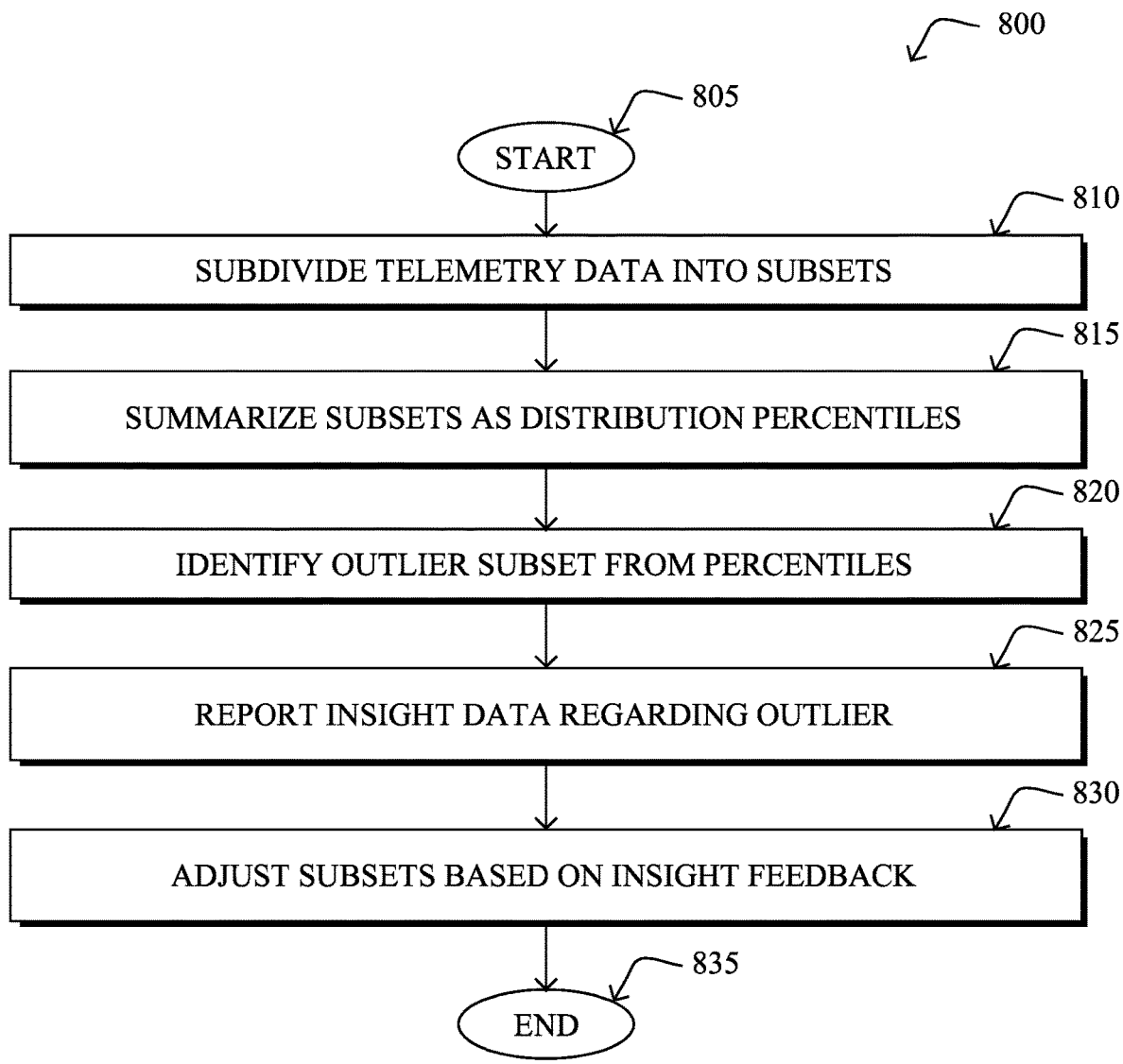
FIG. 8 illustrates an example simplified procedure for pattern discovery from high dimensional telemetry data.

FIG. 8 illustrates an example simplified procedure for pattern discovery from high dimensional telemetry data, in accordance with one or more embodiments described herein. For example, a non-generic, specifically configured device (e.g., device 200) may perform procedure 800 by executing stored instructions (e.g., process 248) to implement a network assurance service that monitors a plurality of networks. The procedure 800 may start at step 805, and continues to step 810, where, as described in greater detail above, the network assurance service may subdivide telemetry data regarding devices located in the networks into subsets. Such devices may include, but are not limited to, radios, wireless access points, wireless access point controllers, routers, switches, or the like. The telemetry data may be indicative of any number of different metric types such as, but not limited to, radio failure count, wireless client count, onboarding failure count, DHCP failure count, authentication failure count, throughput error count, combinations thereof, or the like. In various embodiments, the service may subdivide the telemetry data into subsets such that subset is associated with a certain device type, time period, metric type, and network from which the metric values were collected.

At step 815, as detailed above, the network assurance service may summarize each subset by computing distribution percentiles of metric values in the subset. For example, assume that one of the subsets of the telemetry data indicates the measured wireless client counts for a given AP over the course of a week. In such a case, the network assurance service may compute the mean client count from the distribution of these metric values, as well as any number of percentiles from the distribution (e.g., $25^{th}$ percentile, $75^{th}$ percentile, etc.).

At step 820, the network assurance service may identify an outlier subset by comparing the distribution percentiles that summarize the subsets, as described in greater detail above. For example, the service may use a clustering approach, or other approach, to compare the summarizations of the different subsets, such as across different devices, different networks or locations, different time periods, etc.

At step 825, as detailed above, the network assurance service may report insight data regarding the outlier subset to a user interface. In general, the insight data may indicate the outlier metric and/or any metrics or conditions associated with the outlier metric. For example, an insight may indicate that an abnormally high amount of throughput issues in Building 12 may correspond to an abnormally high number of clients at these times.

At step 830, the network assurance service may adjust the subsets based in part on feedback regarding the insight data from the user interface, as described in greater detail above. The feedback may take any number of different forms. In a simple case, the feedback may be explicit feedback from one or more users regarding the insight data (e.g., a user may provide a rating regarding the relevancy of the insight data). In more complex cases, the service may employ UI analytics to determine which insights the user(s) spend the most time reviewing (e.g., based on whether a user clicks to review additional details, etc.). If the insight data is not of particular relevance to the user(s), the service may form new telemetry data subsets using different parameters such as different metric types, different time periods, etc. In further embodiments, the service may also readjust the subsets to explore which divisions result in the best relevancy feedback from the user(s). For example, if changing the time periods of the subsets from seven days down to six days increases the positive feedback regarding the resulting insight data, the service may explore this further by seeing what feedback results from a division of the telemetry data in five day increments. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for pattern discovery from high dimensional telemetry data in a network assurance service. In some aspects, the techniques herein can be leveraged to generate insights regarding any number of networks monitored by a network assurance service.

While there have been shown and described illustrative embodiments that provide for pattern discovery from high dimensional telemetry data in a network assurance service, it is to be understood that various other adaptations and modifications may be made within the spirit and scope of the embodiments herein. For example, while certain embodiments are described herein with respect to using certain models for purposes of anomaly detection or outlier analysis, the models are not limited as such and may be used for other functions, in other embodiments. In addition, while certain protocols are shown, such as DHCP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    subdividing, by a network assurance service that monitors a plurality of networks operated by two or more organizations, telemetry data regarding devices of a plurality of different types located in the networks into subsets, wherein the telemetry data is subdivided having four dimensions including: a device type of the devices, a time period, a metric associated with the devices, and an organization of the devices;
    summarizing, by the service, each subset by computing distribution percentiles of metric values in the subset;
    identifying, by the service, an outlier subset by comparing the distribution percentiles that summarize the subsets;
    reporting, by the service, insight data regarding the outlier subset to a user interface; and
    adjusting, by the service, the subsets based in part on feedback regarding the insight data from the user interface.

2. The method as in claim 1, wherein the type of the devices comprises at least one of: radio, network access point, or router.

3. The method as in claim 1, wherein the insight data reports a physical location of the network associated with the outlier subset.

4. The method as in claim 1, further comprising:
    receiving, at the service and via the user interface, the feedback regarding the insight data, wherein the feedback is indicative of a perceived relevancy of the insight data to a user of the user interface.

5. The method as in claim 1, wherein adjusting the subsets based in part on the feedback regarding the insight data comprises:
    re-subdividing the telemetry data into new subsets, wherein the subsets and the new subsets differ by at least one of: time period or metric type.

6. The method as in claim 1, wherein adjusting the subsets based in part on the feedback regarding the insight data comprises:
    re-subdividing the telemetry data into new subsets, to find a dimensional split for the telemetry data that results in insight data that receives positive feedback from the user interface.

7. The method as in claim 1, wherein summarizing each subset by computing distribution percentiles of metric values in the subset comprises:
    applying, by the service, differential privacy to the subsets based on their associated organizations so as to conceal information relating to a first organization of the two or more organizations from an end user of a second organization of the two or more organizations.

8. The method as in claim 1, wherein identifying the outlier subset by comparing distribution percentiles that summarize the subsets comprises:
    computing, by the service, Kolmogorov-Smirnov statistics between the subsets.

9. An apparatus, comprising:
    one or more network interfaces to communicate with a network;
    a processor coupled to the network interfaces and configured to execute one or more processes; and
    a memory configured to store a process executable by the processor, the process when executed configured to:
        subdivide telemetry data regarding devices of a plurality of different types located in a plurality of networks into subsets, wherein the plurality of networks are operated by two or more organizations, and wherein the telemetry data is subdivided having four dimensions including: a type of the devices, a time period, a metric associated with the devices, and an organization of the devices;
        summarize each subset by computing distribution percentiles of metric values in the subset;
        identify an outlier subset by comparing the distribution percentiles that summarize the subsets;
        report insight data regarding the outlier subset to a user interface; and
        adjust the subsets based in part on feedback regarding the insight data from the user interface.

10. The apparatus as in claim 9, wherein the type of the devices comprises at least one of: radio, network access point, or router.

11. The apparatus as in claim 9, wherein the insight data reports a physical location of the network associated with the outlier subset.

12. The apparatus as in claim 9, wherein the process when executed is further configured to:
    receive, via the user interface, the feedback regarding the insight data, wherein the feedback is indicative of a perceived relevancy of the insight data to a user of the user interface.

13. The apparatus as in claim 9, wherein the apparatus adjusts the subsets based in part on the feedback regarding the insight data by:
    re-subdividing the telemetry data into new subsets, wherein the subsets and the new subsets differ by at least one of: time period or metric type.

14. The apparatus as in claim 9, wherein the apparatus adjusts the subsets based in part on the feedback regarding the insight data by:
    re-subdividing the telemetry data into new subsets, to find a dimensional split for the telemetry data that results in insight data that receives positive feedback from the user interface.

15. The apparatus as in claim 9, wherein the apparatus summarizes each subset by computing distribution percentiles of metric values in the subset by:
    applying differential privacy to the subsets based on their associated organizations so as to conceal information relating to a first organization of the two or more organizations from an end user of a second organization of the two or more organizations.

16. The apparatus as in claim 9, wherein the apparatus identifies the outlier subset by comparing distribution percentiles that summarize the subsets by:
    computing Kolmogorov-Smirnov statistics between the subsets.

17. A tangible, non-transitory, computer-readable medium storing program instructions that cause a network assurance service that monitors a plurality of networks to execute a process comprising:
    subdividing, by the network assurance service, telemetry data regarding devices of a plurality of different types located in the networks into subsets, wherein the plurality of networks are operated by two or more organizations, and wherein the telemetry data is subdivided having four dimensions including: a type of the devices, a time period, a metric associated with the devices, and an organization of the devices;

summarizing, by the service, each subset by computing distribution percentiles of metric values in the subset;

identifying, by the service, an outlier subset by comparing the distribution percentiles that summarize the subsets;

reporting, by the service, insight data regarding the outlier subset to a user interface; and adjusting, by the service, the subsets based in part on feedback regarding the insight data from the user interface.

18. The computer-readable medium as in claim 17, wherein adjusting the subsets based in part on the feedback regarding the insight data comprises:

re-subdividing the telemetry data into new subsets, wherein the subsets and the new subsets differ by at least one of: time period or metric type.

* * * * *

UNITED STATES PATENT AND TRADEMARK OFFICE
CERTIFICATE OF CORRECTION

PATENT NO. : 10,778,566 B2  
APPLICATION NO. : 15/988084  
DATED : September 15, 2020  
INVENTOR(S) : Grégory Mermoud et al.

Page 1 of 1

It is certified that error appears in the above-identified patent and that said Letters Patent is hereby corrected as shown below:

In the Specification

Column 4, Line 12, please amend as shown:
devices, but rather the ability to connect "objects" in Column 7, Line 43, please amend as shown:
AP1 through nth access point, APn) through which endpoint Column 7, Line 58, please amend as shown:
AP1 through nth access point APn) that provide connective- In the Claims Column 17, Line 12, please amend as shown:
four dimensions including: a type of the Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*